(12) United States Patent
Ojala et al.

(10) Patent No.: US 9,007,477 B2
(45) Date of Patent: Apr. 14, 2015

(54) AUDIO-CONTROLLED IMAGE CAPTURING

(75) Inventors: Pasi Ojala, Kirkkonummi (FI); Radu Bilcu, Tampere (FI)

(73) Assignee: Nokia Corporation, Espoo (FI)

( * ) Notice: Subject to any disclaimer, the term of this patent is extended or adjusted under 35 U.S.C. 154(b) by 494 days.

(21) Appl. No.: 13/380,513

(22) PCT Filed: Jun. 30, 2009

(86) PCT No.: PCT/FI2009/050597
§ 371 (c)(1),
(2), (4) Date: Dec. 22, 2011

(87) PCT Pub. No.: WO2011/001005
PCT Pub. Date: Jan. 6, 2011

(65) Prior Publication Data
US 2012/0098983 A1  Apr. 26, 2012

(51) Int. Cl.
H04N 5/232 (2006.01)
G03B 15/16 (2006.01)
G01S 3/802 (2006.01)

(52) U.S. Cl.
CPC ............ *G03B 15/16* (2013.01); *G01S 3/8022* (2013.01); *H04N 5/23222* (2013.01)

(58) Field of Classification Search
CPC .......... H04N 5/23222; H04N 5/23203; H04N 5/232; G03B 15/16; G01S 3/8022
See application file for complete search history.

(56) References Cited

U.S. PATENT DOCUMENTS

| 4,862,278 | A | 8/1989 | Dann et al. |
| 6,593,956 | B1 | 7/2003 | Potts et al. |
| 7,224,385 | B2 * | 5/2007 | Shinada .................. 348/207.99 |
| 7,483,618 | B1 | 1/2009 | Edwards et al. |
| 7,551,790 | B2 | 6/2009 | Kitani |
| 2002/0018135 | A1 | 2/2002 | Amano |
| 2003/0081504 | A1 * | 5/2003 | McCaskill .................. 367/118 |
| 2004/0236791 | A1 | 11/2004 | Kinjo |
| 2007/0081796 | A1 * | 4/2007 | Fredlund et al. ............. 386/125 |
| 2007/0094602 | A1 | 4/2007 | Murabayashi |
| 2008/0298796 | A1 * | 12/2008 | Kuberka et al. ............... 396/263 |

FOREIGN PATENT DOCUMENTS

| AU | 2004205225 | 3/2005 |
| JP | 2008159049 | 7/2008 |
| JP | 2009510837 | 3/2009 |
| JP | 2009510837 | 12/2009 |

(Continued)

OTHER PUBLICATIONS

Office Action received for corresponding Korean Application No. 2011-7031552, dated May 10, 2013, 6 pages.

(Continued)

*Primary Examiner* — Luong T Nguyen
(74) *Attorney, Agent, or Firm* — Alston & Bird LLP

(57) ABSTRACT

A method comprising: receiving a plurality of images corresponding to a time period covering the intended moment for releasing the shutter; receiving an audio signal associated with the plurality of images using audio capturing means; analyzing the received audio signal in order to determine an auditory event associated with a desired output image; and selecting at least one of the plurality of images on the basis of the analysis of the received audio signal for further processing in order to obtain the desired output image.

17 Claims, 3 Drawing Sheets

(56) References Cited

FOREIGN PATENT DOCUMENTS

KR 100685979 2/2007
WO 2008107138 9/2008

OTHER PUBLICATIONS

Office Action received for corresponding Russian Application No. 2012101497, dated May 20, 2013, 9 pages.
Bilcu et al., "High Dynamic Range Imaging On Mobile Devices", 15th IEEE International Conference on Electronics, Circuits and Systems, 4 pages.
Debevec et al., "Recovering High Dynamic Range Radiance Maps From Photographs", Proceedings of the 24th Annual Conference on Computer Graphics and Interactive Techniques, 10 pages.
Robertson et al., "Dynamic Range Improvement Through Multiple Exposures", In Proceedings of the International Conference on Image Processing, 1999, pp. 159-163.
Reinhard et al., "High Dynamic Range Imaging—Acquisition, Display And Image-Based Lighting", The Morgan Kaufmann Series In Computer Graphics, 522 pages.
International Search Report received for corresponding Patent Cooperation Treaty Application No. PCT/FI2009/050597, dated Feb. 3, 2010, 4 pages.
Written Opinion received for corresponding Patent Cooperation Treaty Application No. PCT/FI2009/050597, dated Feb. 3, 2010, 9 pages.
International Preliminary Report on Patentability received for corresponding Patent Cooperation Treaty Application No. PCT/FI2009/050597, dated Jan. 4, 2012, 10 pages.
Hanjalic, A. et al. "Affective Video Content Representation and Modeling". IEEE Transactions on Multimedia 2005, vol. 7, No. 1 pp. 143-154.
Lockerd, A. et al. "LAFcam-Leveraging Affective Feedback Camcorder", [Online], [retrieved on Dec. 4, 2009] Retrieved from Internet: <URL:http://web.archive.org/web/20060908085802/http://www.floydmueller.com/ projects/LAFCam/LAFCam.pdf>.
Wikipedia "Audio to video synchronization", Apr. 7, 2008, [Online], [retrieved on Dec. 12, 2009] Retrieved from the Internet: <URL: http://web.archive.org/web/2008407220713/http://en.wikipedia.org/wiki/Audio_to_video_synchronization>>
Office Action received for corresponding Korean Patent Application 2011-7031552, dated Feb. 22, 2013, 11 pages.
Office Action received for corresponding Korean Application No. 20117031552, dated Aug. 12, 2013, pages.
Office Action received for corresponding Russian Application No. 2012101497, dated Oct. 21, 2013, pages.
Bilcu et al. "High Dynamic Range Imaging on Mobile Devices", IEEE International Conference on Electronics, Circuits, and Systems, 2008, pp. 1312-1315, Tampere, FI.
Debevec et al. "Recovering High Dynamic Range Radiance Maps from Photographs", 29th International Conference on Computer Graphics and Interactive Techniques, 1997.
Robertson et al. "Dynamic Range Improvement Through Multiple Exposures", IEEE International Conference on Image Processing, Oct. 1999, pp. 159-163, vol. 3.

* cited by examiner

AUDIO-CONTROLLED IMAGE CAPTURING

RELATED APPLICATION

This application was originally filed as PCT Application No. PCT/FI2009/050597 filed Jun. 30, 2009.

FIELD OF THE INVENTION

The present invention relates to imaging, and more particularly to controlling still image capturing according to audio information.

BACKGROUND OF THE INVENTION

In the field of image capturing technology, along with the aim of ensuring the best possible image quality, many cameras have been provided with a so-called multi-shot functionality. In the multi-shot functionality, when the user has released the shutter, the image capturing device is arranged to take several images in order to capture the right moment. The user may then later on select the best one(s) of the multitude of images. In a more advanced solution, the user or the image capturing device may combine several images, or all the captured images, into one composed output image with enhanced visual quality.

In a further embodiment of the multi-shot functionality, it is known to take multiple images with different exposure times and select the desired one(s) as the output image, or for further processing to derive a composed output image with enhanced visual quality.

However, there still remain some disadvantages. Capturing a picture may sometimes require quick reactions in order to catch the picture the user wants to capture. Especially in case the object of the picture is moving, the timing of the picture might easily be non-optimal, the object may have escaped the image and the desired moment is lost. Furthermore, in the known multi-shot solutions, selecting the best quality image or composing an enhanced output image always requires post-processing of the captured images, which the user may experience troublesome and time consuming.

SUMMARY OF THE INVENTION

Now there has been invented an improved method and technical equipment implementing the method, by which the user of the image capturing device is assisted to take a picture with improved quality. Various aspects of the invention include a method, an apparatus and a computer program, which are characterized by what is stated in the independent claims. Various embodiments of the invention are disclosed in the dependent claims.

According to a first aspect, a method according to the invention is based on the idea that of receiving a plurality of images corresponding to a time period covering an intended moment; receiving an audio signal associated with the plurality of images using audio capturing means; analyzing the received audio signal in order to determine an auditory event associated with a desired output image; and selecting at least one of the plurality of images on the basis of the analysis of the received audio signal for further processing in order to obtain the desired output image.

According to an embodiment, the method further comprises receiving the plurality of images comprises capturing the plurality of images during the period covering the intended moment using an image capturing unit in response to a user of an image capturing device giving a command to release a shutter at the intended moment; and receiving the audio signal comprises capturing an audio signal associated with the plurality of images using audio capturing means.

According to an embodiment, the method further comprises receiving a plurality of images corresponding to a first time instant before the intended moment.

According to an embodiment, the method further comprises receiving a plurality of images corresponding to a second time instant after the intended moment.

According to an embodiment, the audio receiving means comprise one or more microphones.

According to an embodiment, the audio receiving means comprise a microphone array consisting of two or more microphones.

According to an embodiment, the method further comprises estimating the direction of arrival of the audio signal in order to determine when the object producing the audio signal is in desired part of the image.

According to an embodiment, the object producing the audio signal residing substantially perpendicular to the microphone array is used to determine when the object is in desired part of the image According to an embodiment, the method further comprises estimating energy of the receiving audio signal in order to determine an event of interest within the plurality of images.

According to an embodiment, an abrupt change in the energy of the receiving audio signal is used to determine the desired moment of the event of interest.

According to an embodiment, the method further comprises estimating a fundamental frequency of the receiving audio signal in order to determine at least one image from the plurality of images in which the object producing the audio signal is closest to the image capturing device providing the plurality of images.

According to an embodiment, the method further comprises using the estimation of the fundamental frequency to select an image in which the object producing the audio signal is approaching the image capturing device providing the plurality of images.

According to an embodiment, the method further comprises obtaining information relating to a distance between the image capturing device providing the plurality of images and the object producing the audio signal; and adjusting the capturing of the audio signal with a delay caused by the speed of sound on said distance.

The arrangement according to the invention provides significant advantages. On a general level, it enables or assists a user of the image capturing device to take a picture with improved quality by analysing an audio signal associated with a plurality of images in order to determine an optimal output image based on the plurality of images. More particularly, the user may capture better quality images by automatically selecting, from the set of images, for example the image in which the object of interest resides in the middle of the viewfinder, or a special audio event (e.g. a crash or explosion) happens, or the object is approaching the camera (front view). The output image is automatically selected at a moment of time, which is closest to a desired audio event.

According to a second aspect, there is provided an apparatus comprising: an image receiving unit for receiving a plurality of images corresponding to a time period covering an intended moment; an audio receiving unit for receiving an audio signal associated with the plurality of images using audio capturing means; an analysing unit for analyzing the received audio signal in order to determine an auditory event associated with a desired output image; and a selecting unit for selecting at least one of the plurality of images on the basis of the analysis of the received audio signal for further processing in order to obtain the desired output image.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 shows an example of a series of multi-shot images;

DESCRIPTION OF EMBODIMENTS

In the following, the invention will be illustrated by referring to image capturing devices in general, occasionally referring to camera devices as well-known examples. It is, however, noted that the invention is not limited to stand-alone cameras solely, but it can be implemented in any image capturing device comprising an image sensor and means for processing the captured image and audio information. For example, the invention may be utilized in a mobile terminal, PDA device, a handheld computer or a laptop computer equipped with a camera module. Therefore, the invention must also be considered from the perspective of such an apparatus receiving images from an image capturing unit and/or audio information from an audio capturing unit, and the apparatus then processes the received image and audio information as described in the embodiments.

The embodiments described below provide a method for controlling the image capturing device, when it is operated in the multi-shot operation mode. In the multi-shot operation mode, the image capturing device, e.g. a camera, is arranged to take a plurality of images every time the shutter is released. The number of images taken in the multi-shot operation mode may be a default setting of the image capturing device or it may be adjustable by the user in the device settings, and the number of captured images may vary from two up to tens or even hundreds of images. The examples described in the embodiments below are based on the setting of capturing ten images in each multi-shot series.

In the multi-shot operation mode, the image capturing device is generally arranged to take a plurality of images during a period, which covers, i.e. includes, the intended moment for releasing the shutter. Preferably, taking the series of images may begin already before the shutter button is firmly pressed down, for example already when the button is pressed half way, which enables to adjust the focus for the subsequent images. The camera may be arranged to store a predefined number of images before and, respectively after the button was firmly pressed down. For example, in a multi-shot series of ten images first five images could be arranged to be captured after the button is the half way but before it is completely pressed down, and the remaining five images are then captured after the button has been completely pressed down.

Regardless of the number of images taken in a multi-shot series, the image capturing device may still comprise a pre-determined margin value controlling the operation such that the images captured earlier than the pre-determined margin before the shutter is completely released could be subsequently discarded without further processing or saving them in the memory.

Figure 1:
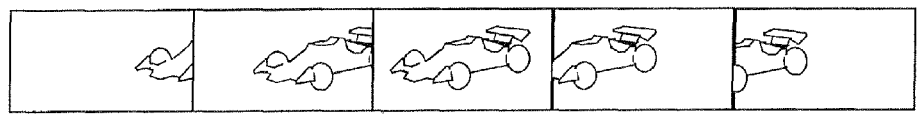

FIG. 1 presents an example of a series of first five pictures taken of an object, i.e. a passing race car in this case, when the user has pressed the button. The latter five pictures are not shown in the figure. The same example of FIG. 1 is utilised in illustrating the embodiments described below.

According to the embodiments, the image capturing device, when operated in the multi-shot operation mode and capturing the multi-shot series of a plurality of images, is also arranged to capture an audio signal associated with the images in the multi-shot series. The time segment for which the audio signal is captured may be a default setting of the image capturing device or it may be adjustable by the user in the device settings. The audio capturing preferably starts substantially at the same time when the image capturing starts. Thus, the image capturing device is preferably arranged to capture a suitable time segment, e.g. five seconds, of audio associated with the series of images before the user has pressed the button completely down, and respectively another suitable time segment after the user has pressed the button completely down.

The image capturing device may store the captured audio signal in a memory for subsequent audio analysis. Alternatively, the audio analysis, as described in detail below, may be performed immediately without storing the full audio segment in the memory.

The purpose of analysis of the captured audio signal associated with the images in the multi-shot series is to identify the moment(s) when one or more images of the multi-shot series most probably have captured an optimal quality image of the desired object. The analysis of the captured audio signal associated with the plurality of images may be based on determining the direction of arrival of major sound components in order to determine when the sound source (i.e. the object) is in desired part of the image, or any discontinuation in the sound level, spectral component or fundamental frequency may be used to invoke the selection algorithm to select one or more images for further processing.

When the most promising time moment has been identified, the one or more images of the multi-shot series associated with said moment can be selected as the optimal quality images. An optimal quality image may then be selected as an output image as such, or one or more images may be selected for further processing in order to produce a better quality output image.

The user is also provided with the possibility to select some other image as the output image than what is the optimal quality image suggested by the analysis. For instance, in the example of FIG. 1, the user can select the output image be the one captured when the race car is situated in the right part of the viewfinder. In this manner, the captured images can contain some other parts of the scene that are important for the user.

Figure 2:
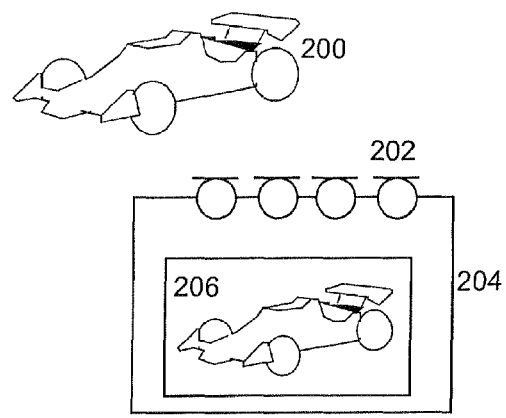
FIG. 2 shows an example of a multi-microphone array arranged in an image capturing device.

The audio signal could be captured with one or more microphones either integrated in the image capturing device or being functionally connected and residing preferably in close proximity to the image capturing device. Especially, if the direction of arrival of major sound components needs to be determined, then a microphone array consisting of two or more microphones, preferably mounted on the image capturing device could be used. An example of such multi-microphone array is presented in FIG. 2, which shows the tracked object 200, an image of which is taken by a camera module 204 of the image capturing device, which image is displayed in the viewfinder 206 of the device. The image capturing device further comprises the multi-microphone array 202, preferably arranged such that the audio capturing from the direction the camera module is pointing at can be carried out most unobstructedly.

The directional multi-microphone array may comprise two or more microphones. Typically the minimum distance between the audio source (object) and any of the microphones in the array is greater than the maximum distance between the microphones. Therefore, the use of e.g. 3, 4, 5 or more microphones may provide improved directional selectivity.

Figure 3:
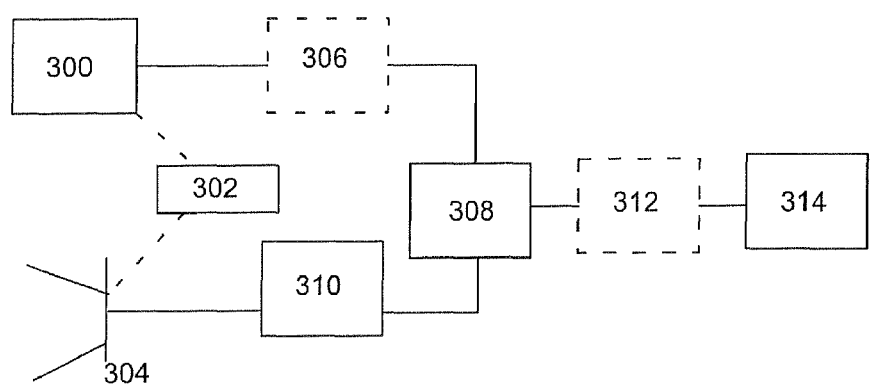
FIG. 3 shows an example of functional units implemented according to an embodiment of the invention.

An example of functional units for implementing the embodiments is described in FIG. 3. An image capturing unit 300 may comprise an image sensor arranged to capture the plurality of images of the multi-shot series according to the instructions received from a control unit 302. The control unit 302, in turn, gives the instructions in response to a user pressing the shutter button (not shown). In a similar manner, the control unit 302 gives instructions, when the user presses the shutter button, to an audio capturing unit 304 to start the capture. The audio capturing unit 304 may comprise said one or more microphones or the multi-microphone array. The plurality of captured images may be temporarily stored in a memory 306, or they may be subjected to an immediate selection process in a selection unit 308.

The selection process in the selection unit 308 is controlled by the information received from an audio analysis unit 310, wherein the captured audio signal associated with the plurality of images is analysed in order to determine an auditory event relating to the desired output image. As a result of this analysis, an image having most probably the best quality may then be selected in the selection unit 308 as an output image 314 as such. Alternatively, one or more images from the multi-shot series may be selected in the selection unit 308 for further processing in a processing unit 312 in order to produce a better quality output image 314. In the processing unit 312, various image processing algorithms may be applied to the selected one or more images to derive a composed output image with enhanced visual quality, or if a plurality of images are selected for further processing, they may just be combined to obtain an improved output image. The output image may then be stored in storage means (not shown in FIG. 3) or shown on a display (not shown in FIG. 3), for example.

Various embodiments for implementing audio analysis unit 310 of FIG. 3, i.e. embodiments for analysing the captured audio signal associated with the plurality of images in order to determine an auditory event relating to the desired output image are described next more in detail.

According to a first embodiment, the analysis is carried out by estimating the direction of arrival of audio signal in order to determine when the sound source is in desired part of the image. According to a further embodiment, a technique referred to as beamforming can be utilised, wherein a multi-microphone array is used to estimate a direction of arrival of an audio signal.

The direction of arrival of the audio source, i.e. the location of the object within the camera viewfinder, can be extracted using beamforming algorithms. A generic microphone array consisting of a plurality (M) of microphones in the beamformer configuration is presented in FIG. 4.

Figure 4:
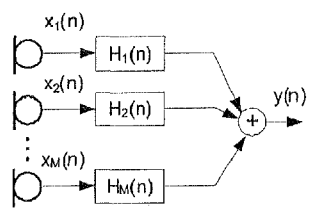
FIG. 4 shows a generic microphone array consisting of a plurality of microphones in a beamformer configuration.

The output of the microphone array of FIG. 4 is determined as $$y(n) = \sum_{m=1}^{M} \sum_{k=0}^{L-1} H_m(n) x_m(n-k), \quad (1)$$

where $H_m(n)$ is the beamforming filter and L denotes the length of the beamforming filters $H_1, H_2, \ldots, H_M$. The most trivial selection of the filters $H_1, H_2, \ldots, H_M$ are delay lines, thus giving the output of the microphone array as $$y(n) = \sum_{m=1}^{M} x_m(n - \tau_m), \quad (2)$$

where $\tau_m$ is the delay corresponding to the direction of arrival of each signal $x_1, x_2, \ldots, x_M$. The directionality may also be implemented in the frequency sub-band domain or e.g. in the DFT (discrete fourier transform) transform domain. In that case the delay for each microphone may be frequency-dependent.

The direction of arrival of sound source (see FIG. 2) compared to nominal axis perpendicular to the view finder image and microphone array is determined by searching the optimal delay value for each microphone line. The delay $\tau_m$ is understood as the difference of the distance between the source and different microphones as follows $$\tau_m = (|s - x_m| - |s - x_i|)/c, \quad (3)$$

where s is the desired tracked audio source location coordinates, $x_m$ is the location of the microphone m, $x_i$ is the location of "zero delay" microphone i. c is the speed of sound. It should be noted that in this embodiment the delay in microphone i is always set to zero. The zero delay, i.e. the microphone i could be allocated to any of the microphones in the array.

According to the embodiment, the multi microphone beamformer is applied in detecting the audio source location e.g. by searching for the filter coefficients that maximise the microphone array output energy. In the most trivial case the delay values for each microphone line is determined in such a manner that the output energy is maximised $$\tau_{m,opt} = \underset{\tau_m}{\operatorname{argmax}} (y(n)^T y(n)) \quad (4)$$

The direction of arrival of audio source could be determined e.g. in the range of $-\pi/2 \leq \phi \leq \pi/2$, where zero angle is perpendicular to the microphone array. Based on the optimal delay for each microphone line, and using the knowledge of microphone position (distance between microphones), the desired direction of arrival could be determined solving from the equation $$\tau_m = (|x_m x_i| \sin(\phi))/c \quad (5)$$

In this approach, the direction of arrival is identical to every microphone and the distance of the sound source is considered significantly larger corresponding to the distance between microphones. Similar determination of time delays could be done in both horizontal and vertical direction when the microphone array design is two dimensional.

Figure 5:
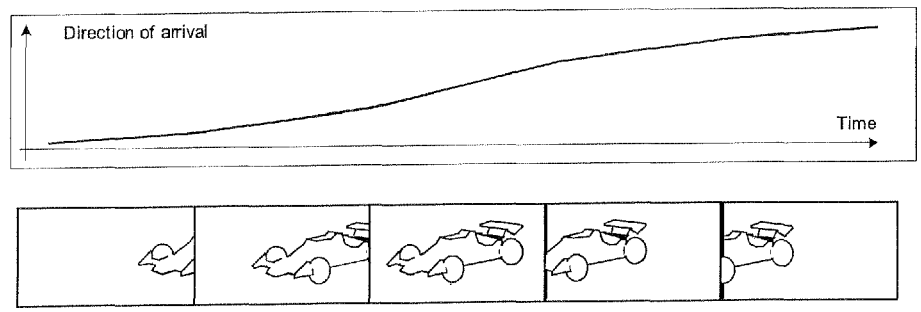
FIG. 5 shows an example of sound direction of arrival estimation for a captured audio signal.

FIG. 5 shows an example of sound direction of arrival estimation for the captured audio signal corresponding to the series of images in FIG. 1. The corresponding sound direction of arrival is determined for each time instant when an image is captured. The scale of time axis of FIG. 5 corresponds to that of FIG. 1 as illustrated therein below, and the scale of the direction of arrival is the range of $-\pi/\le\phi\le\pi/2$, whereby zero angle resides approximately in the midpoint of the vertical axis.

As can be seen, the curve estimating the direction of arrival of the audio seems to reach the zero angle point (i.e. the object residing substantially perpendicular to multi-microphone array) at the time instant of the third image. This most presumably indicates that the sound source is in the middle of the viewfinder at the time the third picture was taken, and therefore the third image can be considered most promising candidate for optimal output image.

According to a second embodiment, the analysis of the captured audio signal associated with the plurality of images is carried out by determining the sound level of the audio signals. This is a rather straightforward approach, wherein an abrupt change in the sound level may be used to reveal the desired moment to capture the image. The implementation does not require a directional microphone array, but only a single microphone could be used in capturing the audio signal. The microphone signal level could be determined sample by sample for example using the equation $$e(n)=y(n)^T y(n) \tag{6}$$

wherefrom a sound level estimation versus the time spent on capturing the plurality of images can be created.

Figure 6:
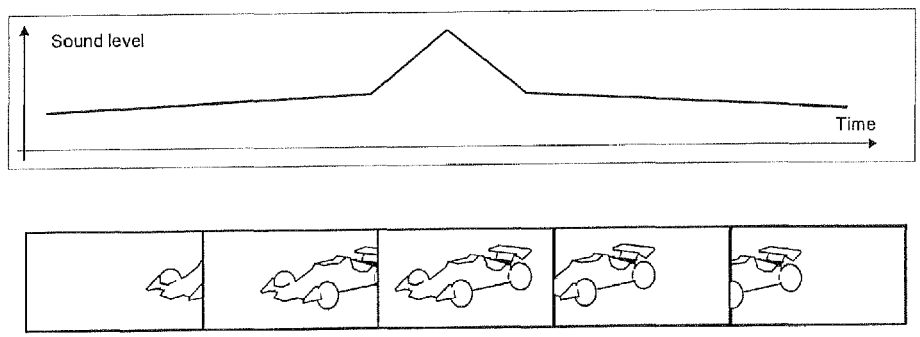
FIG. 6 shows an example of sound level estimation for the captured audio signal.

FIG. 6 shows an example of sound level estimation for the captured audio signal corresponding to the series of images in FIG. 1. The corresponding sound level is determined for each time instant an image is captured. The scale of time axis of FIG. 6 corresponds to that of FIG. 1 as illustrated below. As can be seen, at the time instant of the third image the sound level curve appears to have a sudden change and reaches the maximum level at the time instant of the third image. The sudden change may be used as an indication that the sound source is in the middle of the viewfinder or at least some special event has happened approximately at the same time the third picture was taken. Alternatively, or additionally, the maximum sound level may be used as an indication that the sound source was in the middle of the viewfinder approximately at the same time the third picture was taken.

According to a third embodiment, the analysis of the captured audio signal associated with the plurality of images is carried out by determining a change in the fundamental frequency of the sound of the object. As is generally known from the physics of the Doppler effect, objects getting closer to the listener (or microphone) have a frequency shift towards higher frequencies compared to the objects getting further away from the listener. Thus, by determining the time instant when a change from a higher fundamental frequency to a lower fundamental frequency occurs, it can also be revealed when the object emitting the sound is closest to the listener, i.e. the image capturing device in this context.

The fundamental frequency of the sound of the object can be determined as an inverse of the time delay corresponding to the maximal value of autocorrelation of the dominant audio source. Hence, a simple correlation analysis of the dominant audio source is preferably carried out, wherein the delay $\tau_n$ within predetermined range of candidate values d maximising the autocorrelation is determined as follows $$\tau_n = \arg\max_d \{\Phi_n(k,d)\} \tag{7}$$

where $\Phi_n(d,k)$ is normalised correlation $$\Phi_n(d, k) = \frac{s_n(k - d_1)^T s_n(k - d_2)}{\sqrt{(s_n(k - d_1)^T s_n(k - d_1))(s_n(k - d_2)^T s_n(k - d_2))}} \tag{8}$$

$$\text{where } \begin{aligned} d_1 &= \max\{0, -d\} \\ d_2 &= \max\{0, d\} \end{aligned} \tag{9}$$

and k is the sampling time instant and $s_n$ is the sound signal.

Thereafter, the fundamental frequency of the sound of the object can be determined as the inverse of the delay value.

Figure 7:
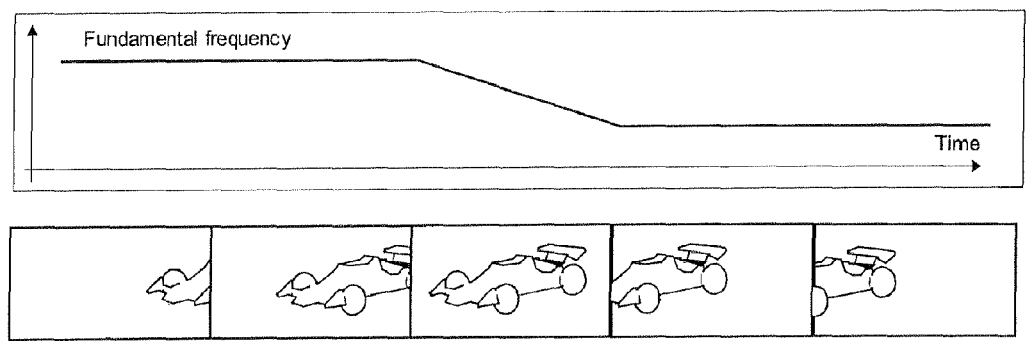
FIG. 7 shows an example of the fundamental frequency estimation for the captured audio signal.

FIG. 7 shows an example of the fundamental frequency estimation for the captured audio signal corresponding to the series of images in FIG. 1. The corresponding fundamental frequency is determined for each time instant an image is captured. Again, the scale of time axis of FIG. 7 corresponds to that of FIG. 1 as illustrated therein below. As can be seen, during the first two images the fundamental frequency is constant on a higher frequency, indicating an object getting closer to the microphone of the image capturing device. Then at the time instant of the third image, there is a linear change in the fundamental frequency to a lower frequency level, and thereafter the fundamental frequency remains on that constant lower frequency, indicating the object getting further away from the microphone of the image capturing device. Thus, the change during the third image from a higher fundamental frequency to a lower fundamental frequency indicates that the sound source was then closest to the image capturing device and most presumably in the middle of the viewfinder or at least some special event has happened about the same time the third picture was taken.

According to an embodiment, the fundamental frequency estimation may be used to select an image in which the object is getting closer to the microphone of the image capturing device; i.e. an image corresponding to a higher fundamental frequency. The information may be utilised, for example, to get a front image of the object.

According to an embodiment, if the object is relatively far from the camera, the limitation of the speed of sound may need to be taken into account. If the distance to the object is known to be e.g. 340 meters, a delay of approximately one second needs to be considered when capturing and associating the audio information with the plurality of captured images. Naturally the delay must be adjusted in accordance with the actual or estimated distance to the object, for example with 500 m distance the delay is approximately 1.5 seconds and with 170 m distance the delay is approximately 0.5 seconds.

According to an embodiment, the information indicating the distance to the object could be extracted, for example, from the focal information. Alternatively, the distance information could be estimated by a stereoscopic camera, wherein two imaging sensors are situated at certain distance within the same device, thus producing two images showing slightly different views of the scene. This difference is then exploited to estimate the distance to a certain object of the scene.

A skilled man appreciates that any of the embodiments described above may be implemented as a combination with one or more of the other embodiments, unless there is explicitly or implicitly stated that certain embodiments are only alternatives to each other.

The camera module can be implemented in the image capturing device as an integral part of the device, i.e. as an embedded structure, or the camera module may be a separate module, which comprises the required image and audio capturing and/or processing functionalities and which is attachable to various kinds of data processing devices.

The functionalities of the embodiments may be implemented in the image capturing device preferably as a computer program which, when executed in a central processing unit CPU or in a dedicated digital signal processor DSP, affects the device to implement procedures of the invention. Functions of the computer program SW may be distributed to several separate program components communicating with one another. The computer software may be stored into any memory means, such as the hard disk of a PC or a CD-ROM disc, from where it can be loaded into the memory of device. The computer software can also be loaded through a network, for instance using a TCP/IP protocol stack.

It is also possible to use hardware solutions or a combination of hardware and software solutions to implement the inventive means. Accordingly, the above computer program product can be at least partly implemented as a hardware solution, for example as ASIC or FPGA circuits, in a hardware module comprising connecting means for connecting the module to an electronic device, or as one or more integrated circuits IC, the hardware module or the ICs further including various means for performing said program code tasks, said means being implemented as hardware and/or software.

It is obvious that the present invention is not limited solely to the above-presented embodiments, but it can be modified within the scope of the appended claims.

The invention claimed is:

1. A method comprising:
   receiving a plurality of images corresponding to a time period covering an intended moment;
   receiving an audio signal associated with the plurality of images;
   estimating the direction of arrival of the audio signal in order to determine when an object producing the audio signal is in a desired part of an image;
   analyzing the received audio signal in order to determine an auditory event associated with a desired output image; and
   selecting at least one of the plurality of images on the basis of the analysis of the received audio signal for further processing in order to obtain the desired output image.

2. The method according to claim 1, wherein
   receiving the plurality of images comprises capturing the plurality of images during the time period covering the intended moment using an image capturing unit in response to a user of an image capturing device giving a command to release a shutter at the intended moment; and
   receiving the audio signal comprises capturing the audio signal associated with the plurality of images using audio capturing means.

3. The method according to claim 1, further comprising:
   receiving a plurality of images corresponding to a first time instant before the intended moment.

4. The method according to claim 1, further comprising:
   receiving a plurality of images corresponding to a second time instant after the intended moment.

5. The method according to claim 1, further comprising:
   estimating energy of the received audio signal in order to determine an event of interest within the plurality of images.

6. The method according to claim 5, wherein an abrupt change in the energy of the received audio signal is used to determine a desired moment of the event of interest.

7. The method according to claim 1, further comprising:
   estimating a fundamental frequency of the received audio signal in order to determine at least one image from the plurality of images in which an object producing the audio signal is closest to the image capturing device providing the plurality of images.

8. The method according to claim 7, further comprising:
   using the estimation of the fundamental frequency to select an image in which the object producing the audio signal is approaching the image capturing device providing the plurality of images.

9. An apparatus comprising:
   at least one processor; and
   at least one memory including computer program code for one or more programs,
   the at least one memory and the computer program code configured to, with the at least one processor, cause the apparatus to perform at least the following,
   receive a plurality of images corresponding to a time period covering an intended moment;
   receive an audio signal associated with the plurality of images;
   estimate the direction of arrival of the audio signal, captured by a microphone array, in order to determine when the object producing the audio signal is in a desired part of the image;
   analyze the received audio signal in order to determine an auditory event associated with a desired output image; and
   select at least one of the plurality of images on the basis of the analysis of the received audio signal for further processing in order to obtain the desired output image.

10. The apparatus according to claim 9, wherein
    the apparatus is further caused to:
    receive a plurality of images corresponding to a first time instant before the intended moment.

11. The apparatus according to claim 9, wherein
    the apparatus is further caused to:
    receive a plurality of images corresponding to a second time instant after the intended moment.

12. The apparatus according to claim 9, wherein
    the apparatus is further caused to:
    determine that the object is in desired part of the image when the object producing the audio signal residing substantially perpendicular to the microphone array.

13. The apparatus according to claim 9, wherein the apparatus is further caused to:
    estimate energy of the received audio signal in order to determine an event of interest within the plurality of images.

14. The apparatus according to claim 13, wherein
    the apparatus is further caused to:
    determine that the desired moment of the event of interest is when there is an abrupt change in the energy of the received audio signal.

15. The apparatus according to claim 9, wherein the apparatus is further caused to:
    estimate a fundamental frequency of the received audio signal in order to determine at least one image from the plurality of images in which an object producing the audio signal is closest to the image capturing device providing the plurality of images.

16. The apparatus according to claim 15, wherein the apparatus is further caused to:

use the estimation of the fundamental frequency to select an image in which the object producing the audio signal is approaching the image capturing device providing the plurality of images.

17. A computer program product comprising a non-transitory computer-readable medium bearing computer program code embodied therein for use with a computer, the computer program code configured for:

receiving a plurality of images corresponding to a time period covering an intended moment;

receiving an audio signal associated with the plurality of images;

estimating the direction of arrival of the audio signal, received from a microphone array consisting of two or more microphones, in order to determine when an object producing the audio signal is in a desired part of an image;

analyzing the received audio signal in order to determine an auditory event associated with a desired output image; and selecting at least one of the plurality of images on the basis of the analysis of the received audio signal for further processing in order to obtain the desired output image.

* * * * *